US012036791B2

(12) United States Patent
Kobayashi

(10) Patent No.: US 12,036,791 B2
(45) Date of Patent: Jul. 16, 2024

(54) LIQUID DISCHARGE APPARATUS, LIQUID DISCHARGE METHOD, AND STORAGE MEDIUM

(71) Applicant: Makoto Kobayashi, Kanagawa (JP)

(72) Inventor: Makoto Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 142 days.

(21) Appl. No.: 17/712,444

(22) Filed: Apr. 4, 2022

(65) Prior Publication Data

US 2022/0324225 A1 Oct. 13, 2022

(30) Foreign Application Priority Data

Apr. 8, 2021 (JP) ................................ 2021-065881

(51) Int. Cl.
*B41J 2/045* (2006.01)
*B41J 2/145* (2006.01)

(52) U.S. Cl.
CPC ....... *B41J 2/04588* (2013.01); *B41J 2/04558* (2013.01); *B41J 2/145* (2013.01)

(58) Field of Classification Search
CPC .... B41J 2/04588; B41J 2/04558; B41J 2/145; B41J 2/04551; B41J 2/04586; B41J 29/393
See application file for complete search history.

(56) References Cited

U.S. PATENT DOCUMENTS 5,610,637 A 3/1997 Sekiya et al.
6,234,602 B1 * 5/2001 Soto ...................... B41J 29/393 347/19

(Continued)

FOREIGN PATENT DOCUMENTS

| | | | |
|---|---|---|---|
| CN | 103097142 | A | 5/2013 |
| CN | 111596536 | A | 8/2020 |
| JP | 2001-232775 | A | 8/2001 |

(Continued)

OTHER PUBLICATIONS

Extended European Search Report dated Sep. 7, 2022 issued in corresponding European Appln. No. 22166366.9.

(Continued)

*Primary Examiner* — Jason S Uhlenhake
(74) *Attorney, Agent, or Firm* — Harness, Dickey & Pierce, P.L.C.

(57) ABSTRACT

A liquid discharge apparatus includes a discharge device, a driving device, processing circuitry, and a reading device. The discharge device discharges liquid to a recording medium to form a test pattern. The driving device causes the discharge device to discharge the liquid according to a driving waveform. The processing circuitry inputs a plurality of driving waveforms and acquires first data indicating a standard pattern that corresponds to the driving waveform and is formed with the driving waveform or indicating a parameter of the standard pattern. The reading device reads the test pattern to generate second data. The processing circuitry compares the second data with the first data and selects a driving waveform generating a smallest difference between the second data and the first data, based on a result of comparison of the second data with the first data.

7 Claims, 10 Drawing Sheets

(56) References Cited

U.S. PATENT DOCUMENTS

| | | | |
|---|---|---|---|
| 2004/0239709 | A1 | 12/2004 | Sekiya et al. |
| 2018/0099510 | A1 | 4/2018 | Niino |

FOREIGN PATENT DOCUMENTS

| | | | |
|---|---|---|---|
| JP | 2007-152670 | | 6/2007 |
| JP | 2008-080730 | A | 4/2008 |
| JP | 2018-001734 | | 1/2018 |
| JP | 2018-058320 | | 4/2018 |
| WO | WO-2012/040424 | A2 | 3/2012 |

OTHER PUBLICATIONS

Chinese Office Action, dated Jul. 1, 2023, issued in Chinese Patent Application No. 202210319946.9.

* cited by examiner

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119(a) to Japanese Patent Application No. 2021-065881, filed on Apr. 8, 2021, in the Japan Patent Office, the entire disclosure of which is hereby incorporated by reference herein.

TECHNICAL FIELD

Embodiments of the present disclosure relate to a liquid discharge apparatus, a liquid discharge method, and a storage medium.

RELATED ART

A technique is known in which an inkjet head discharges liquid, such as ink, to form an image.

For example, first, an inkjet recording apparatus forms dots at predetermined intervals to form a test pattern on a recording medium. Then, the inkjet recording apparatus measures the density of the dots. Next, on the basis of the measurement result, the inkjet recording apparatus determines the type of the recording medium. Such a technique is known of forming a test pattern to accurately determine the type of a recording medium.

SUMMARY

According to an embodiment of the present disclosure, a liquid discharge apparatus includes a discharge device, a driving device, processing circuitry, and a reading device. The discharge device discharges liquid to a recording medium to form a test pattern. The driving device causes the discharge device to discharge the liquid according to a driving waveform. The processing circuitry inputs a plurality of driving waveforms and acquires first data indicating a standard pattern that corresponds to the driving waveform and is formed with the driving waveform or indicating a parameter of the standard pattern. The reading device reads the test pattern to generate second data. The processing circuitry compares the second data with the first data and selects a driving waveform generating a smallest difference between the second data and the first data, based on a result of comparison of the second data with the first data.

According to another embodiment of the present disclosure, there is provided a liquid discharge method to be performed by a liquid discharge apparatus. The liquid discharge method includes discharging, controlling, inputting, acquiring, reading, comparing, and selecting. The discharging discharges liquid by a liquid discharge apparatus to a recording medium to form a test pattern. The controlling controls the liquid discharge apparatus to discharge the liquid according to a driving waveform. The inputting inputs a plurality of driving waveforms. The acquiring acquires first data that indicates a standard pattern that corresponds to the driving waveform and is formed with the driving waveform, or indicates a parameter of the standard pattern. The reading reads the test pattern to generate second data. The comparing compares the second data with the first data. The selecting selects a driving waveform generating a smallest difference between the second data and the first data, based on a result of comparison of the second data with the first data by the comparing.

According to still another embodiment of the present disclosure, there is provided a non-transitory recording medium storing a plurality of instructions which, when executed by one or more processors, cause the processors to perform discharging, controlling, inputting, acquiring, reading, comparing, and selecting. The discharging discharges liquid by a liquid discharge apparatus to a recording medium to form a test pattern. The controlling controls the liquid discharge apparatus to discharge the liquid according to a driving waveform. The inputting inputs a plurality of driving waveforms. The acquiring acquires first data that indicates a standard pattern that corresponds to the driving waveform and is formed with the driving waveform, or indicates a parameter of the standard pattern. The reading reads the test pattern to generate second data. The comparing compares the second data with the first data. The selecting selects a driving waveform generating a smallest difference between the second data and the first data, based on a result of comparison of the second data with the first data by the comparing.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is a diagram illustrating an example of coupling of an information processing device and the like;

FIG. 5 is a table illustrating an example of input of a plurality of driving waveforms and the like;

DETAILED DESCRIPTION OF EMBODIMENTS

Figure 1:
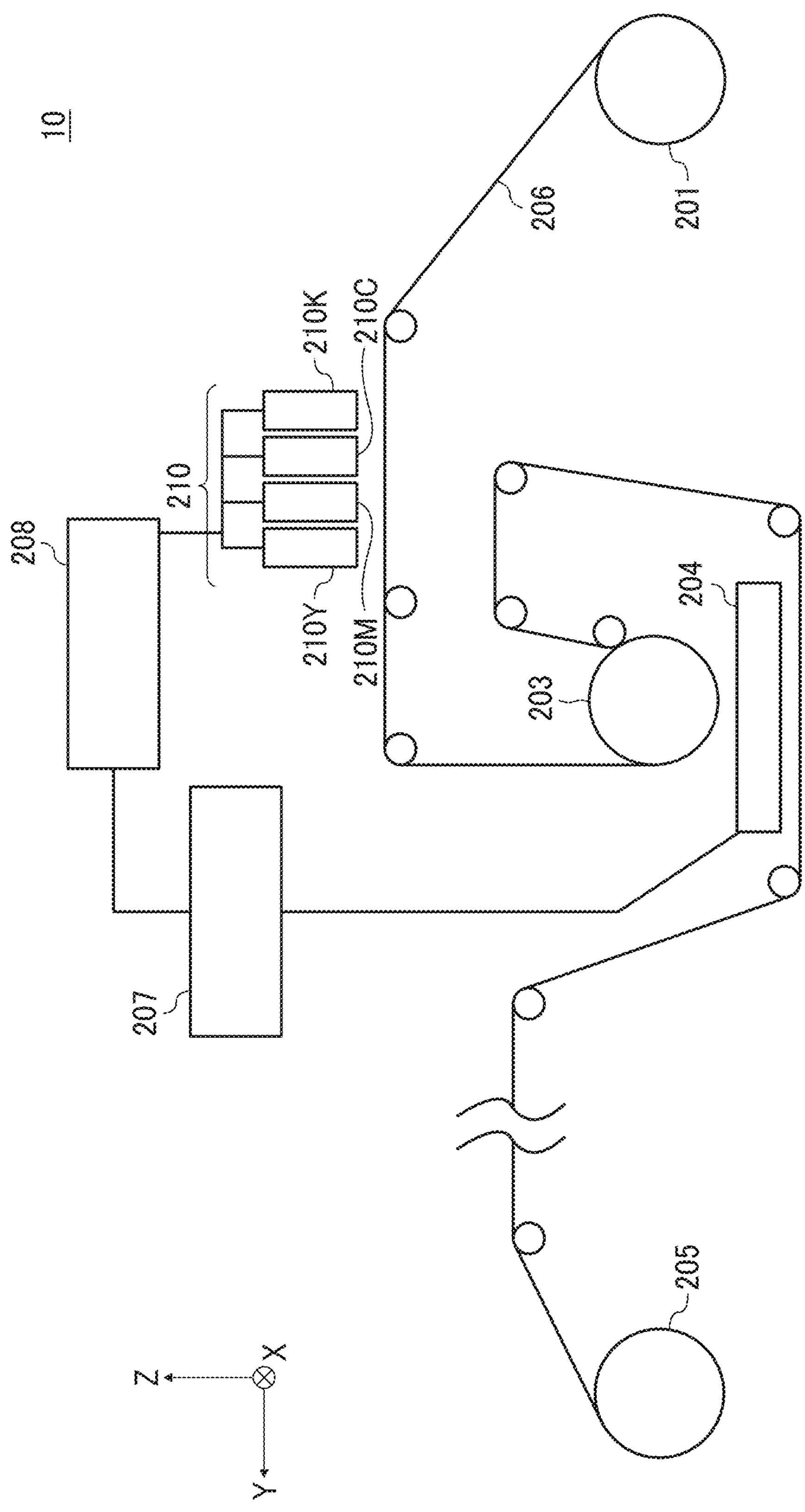
FIG. 1 is a diagram illustrating an example of a general configuration of a liquid discharge apparatus.

Hereinafter, specific examples will be described with reference to the accompanying drawings. Note that embodiments are not limited to the specific examples described below.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Example of Liquid Discharge Apparatus

FIG. 1 is a diagram illustrating an example of general configuration of a liquid discharge apparatus. Hereinafter, an example in which the liquid discharge apparatus is an image forming apparatus 10 will be described. In the example described below, a recording medium is a web 206. In the example described below, liquid discharged by the image forming apparatus 10 is ink.

Hereinafter, a direction in which the recording medium is conveyed is the "conveyance direction Y". The conveyance direction Y is a left or right direction in FIG. 1. In the description below, the recording medium is conveyed from the "upstream side" to the "downstream side". Therefore, in FIG. 1, the right side is the upstream side, and the left side is the downstream side. A direction perpendicular to the conveyance direction Y is referred to as the "perpendicular direction X". A direction vertical to the conveyance direction Y, that is to say a surface of the recording medium, is referred to as the "vertical direction Z".

The image forming apparatus 10 uses a head 210 to perform inkjet image formation. Hereinafter, an example will be described in which the head 210 includes four heads that include a K head 210K, a C head 210C, an M head 210M, and a Y head 210Y that align in this order from the upstream side to the downstream side. The K head 210K, the C head 210C, the M head 210M, and the Y head 210Y may be collectively referred to as the "head 210".

The image forming apparatus 10 includes an unwinder 201, the head 210, a dryer 203, a reading device 204, a rewinder 205, a superior device 207, an engine 208, and the like.

The unwinder 201 is a sheet feeder that rolls out and supplies the web 206 that is roll-shaped.

The rewinder 205 is an accommodation device that rewinds and accommodates the web 206.

The web 206 is a long sheet. As illustrated, the web 206 is conveyed from the unwinder 201 that is upstream to the rewinder 205 that is downstream. The web 206 is conveyed by, for example, actuators, such as conveyance rollers, and mechanical components.

The head 210 includes a plurality of nozzles. The head 210 discharges ink from the nozzles to the web 206 conveyed directly under the head 210 to perform image formation.

The dryer 203 dries the web 206. For example, the dryer 203 dries the web 206 with a heat drum that is in contact with the web 206.

The reading device 204 is, for example, a scanner. Therefore, the reading device 204 captures the web 206 to generate image data and the like.

The image forming apparatus 10 may include a device not described above. The image forming apparatus 10 may include, for example, a device for forming an image on the back side, or a device for performing aftertreatment.

Figure 2:
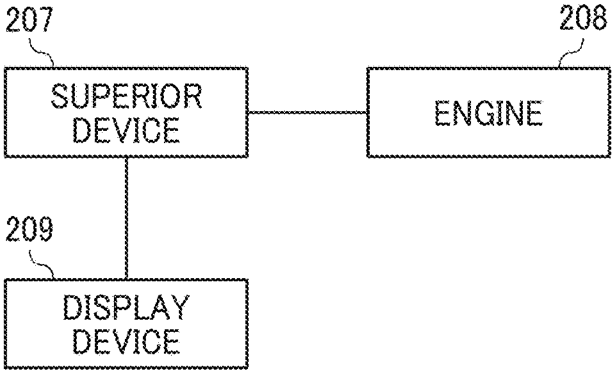

FIG. 2 is a diagram illustrating an example of coupling of an information processing device and the like. For example, the engine 208, a display device 209, and the like are coupled to the superior device 207.

The superior device 207 is, for example, an information processing device that has a following hardware configuration.

Figure 3:
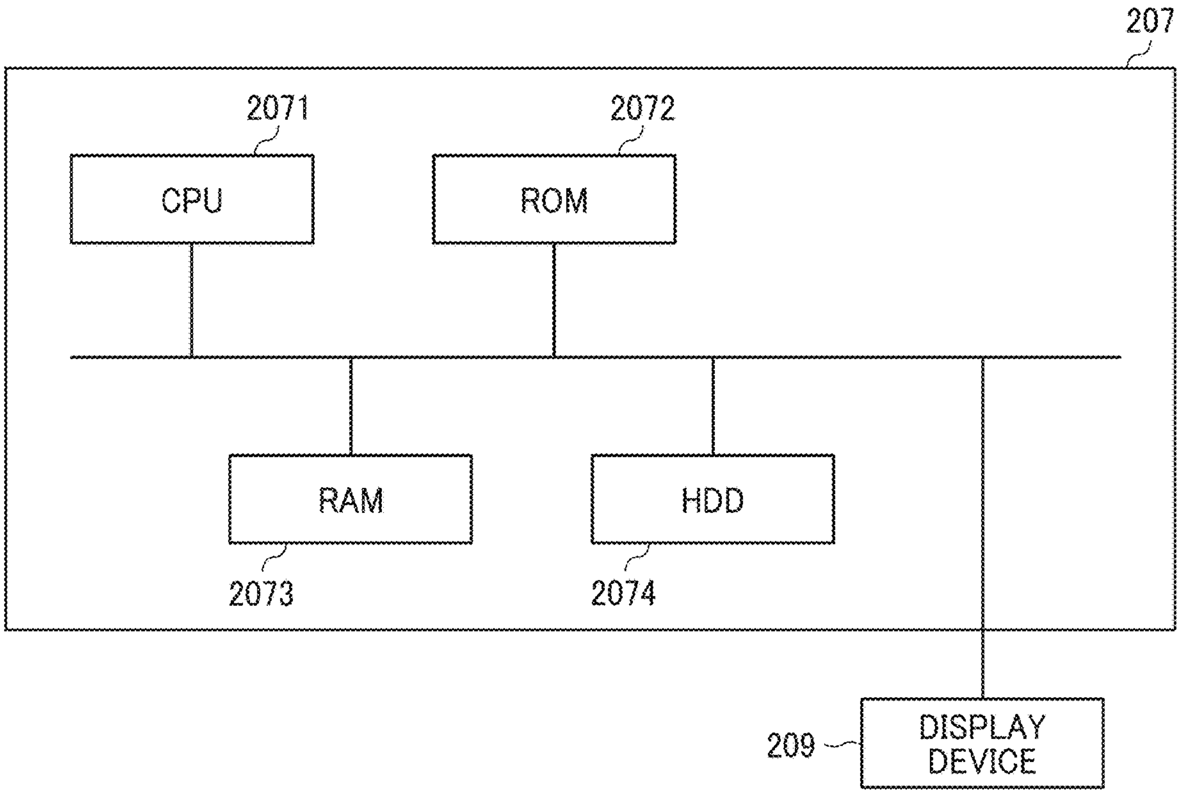
FIG. 3 is a diagram illustrating an example of hardware configuration of the information processing device.

FIG. 3 is a diagram illustrating an example of hardware configuration of the information processing device. For example, the superior device 207 includes hardware, such as a central processing unit (hereinafter referred to as the "CPU 2071"), read-only memory (hereinafter referred to as the "ROM 2072"), random-access memory (hereinafter referred to as the "RAM 2073"), and a hard disk drive (hereinafter referred to as the "HDD 2074").

The CPU 2071 is an example of an computing device and a control device.

The ROM 2072, the RAM 2073, and the HDD 2074 are an example of a storage device.

An output device, such as the display device 209, and the like are also coupled to the superior device 207 through interfaces. An input device and an external device may also be coupled to the superior device 207 through interfaces.

The display device 209 is an example of an output device that outputs a processing result and the like.

Note that the information processing device is not limited to the illustrated hardware configuration. For example, the information processing device may include the computing device, the control device, the storage device, the input device, the output device, an auxiliary device, or the like outside or inside the information processing apparatus.

The superior device 207 is a digital front end (that may be referred to as a "DFE"). More specifically, the superior device 207 performs raster image processor (RIP) processing and the like. Further, the superior device 207 generates data for performing image formation (hereinafter referred to as the "control data") and the like, on the basis of job data and settings of a host device.

The control data includes information, such as driving waveforms selected in processing for adjusting an image, and the like. The control data also includes information on a result of adjustment of nozzle alignment spaces. The control data also includes information on printing conditions that include a result of adjustment of gradation.

The printing conditions are, for example, information, such as printing forms, printing types, information regarding sheet feeding, information regarding sheet ejection, information about recording media, the order of printing of the sides, sizes of recording media, a data amount of image data, resolution, gradation, colors, and the number of pages.

On the basis of the control data and the like sent by the superior device 207, the engine 208 controls the head 210 and the like to perform processing, such as image formation.

The image forming apparatus 10 is not limited to the configurations illustrated in FIGS. 1 to 3. For example, the image forming apparatus 10 may include an information processing device not described above, and the like. Therefore, in the image forming apparatus 10, a device except the superior device 207 may perform processing.

Whole Processing Example

Figure 4:
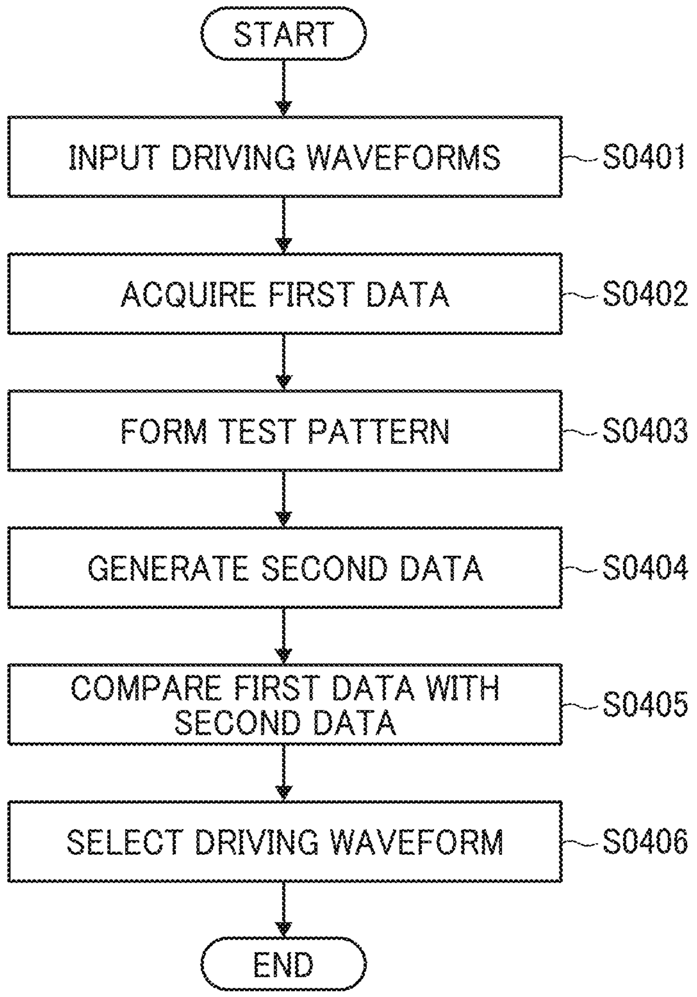
FIG. 4 is a flowchart illustrating a whole processing example.

FIG. 4 is a flowchart illustrating a whole processing example.

In step S0401, the liquid discharge apparatus inputs a plurality of driving waveforms. Therefore, on the basis of the driving waveforms input in step S0401, the liquid discharge apparatus discharges liquid.

In step S0402, the liquid discharge apparatus acquires first data.

The first data is data preliminarily acquired by forming a pattern with the driving waveforms. Hereinafter, the pattern formed to acquire the first data is referred to as the "standard pattern".

Dots that constitute the standard pattern are referred to as the "first dots". The diameter of the first dots is referred to as the "first dot diameter".

The first data is, for example, a parameter, such as a numerical value that indicates the first dot diameter. However, the first data may be of a form except a numerical value that indicates the first dot diameter. The first data may be, for example, image data or the like that indicates the first dots. Therefore, the first data may be a numerical value or the like input by input operation of a user, or may be acquired from a result of image analysis or the like of the standard pattern. If image data is used in this way, an image of first dots indicated by the image data is analyzed to acquire a parameter for the first data. Therefore, the first data may be image data or the like that indicates dots as a "sample", or may be a numerical value or the like input by a user.

In step S0403, the liquid discharge apparatus discharges liquid to a recording medium to form a test pattern.

In step S0404, the liquid discharge apparatus generates second data.

The second data is data generated on the basis of a result of reading the test pattern formed in step S0403. Hereinafter, dots that constitute the test pattern are referred to as the "second dots". The diameter of the second dots is referred to as the "second dot diameter".

In step S0405, the liquid discharge apparatus compares the first data with the second data.

In step S0406, the liquid discharge apparatus selects a driving waveform on the basis of the comparison result.

The above-described processing may be performed after selecting resolution (that is to say, a minimum pixel unit of an image). According to the resolution, usable driving waveforms and the like may be specified. For example, the resolution may be selected with a user interface (UI) according to an application or the like.

Further, the liquid discharge apparatus may correct nozzle alignment spaces, liquid discharge timings, the density, the gradation, or the combination of the nozzle alignment spaces, the liquid discharge timings, the density, and the gradation. For example, if the density is corrected, the variation in the density of each liquid discharge apparatus, the variation in the density of the front and the back, or the like is restricted to make the characteristics of the density and the gradation harmonize with each other.

To correct the gradation, the liquid discharge apparatus first calculates the density at nozzle intervals. Then the liquid discharge apparatus makes an adjustment to allow the densities to be the average density. In this way, the adjustment is made to decrease density unevenness in the head 210. Alternatively, the liquid discharge apparatus adjusts a gradation value or the like of each of the K head 210K, the C head 210C, the M head 210M, and the Y head 210Y to decrease color differences or the like between the K head 210K, the C head 210C, the M head 210M, and the Y head 210Y.

When such correction and the like described above are performed, the liquid discharge apparatus improves the image quality.

Figure 5:
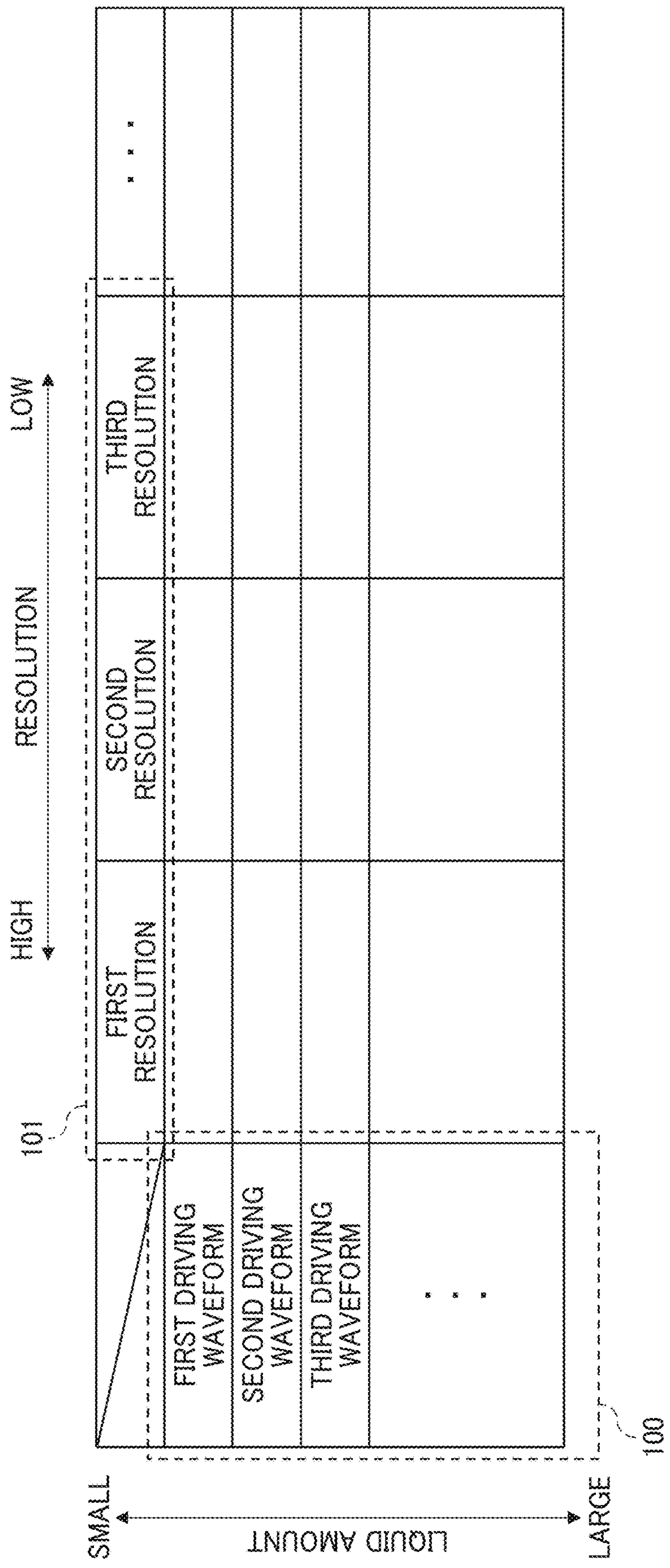

FIG. 5 is a table illustrating an example of input of a plurality of driving waveforms 100 and the like. Hereinafter, the plurality of driving waveforms 100 includes a "first driving waveform", a "second driving waveform", and a "third driving waveform".

In this example, when the first driving waveform is used, the amount of discharged liquid is the smallest. When the third driving waveform is used, the amount of discharged liquid is the largest.

Hereinafter, resolution 101 can be selected from "first resolution", "second resolution", and "third resolution".

In this example, the first resolution is the highest resolution, and the third resolution is the lowest resolution.

A test pattern differs by the combination of the resolution 101 and the driving waveforms 100. If as illustrated, the three driving waveforms 100 and the three types of resolution 101 are used, nine results are obtained. The number of the driving waveforms 100 and the number of the types of the resolution 101 are not limited to three. The driving waveforms 100 that are usable may be different for each of conditions, such as the resolution 101.

Example of Test Pattern

Figure 6:
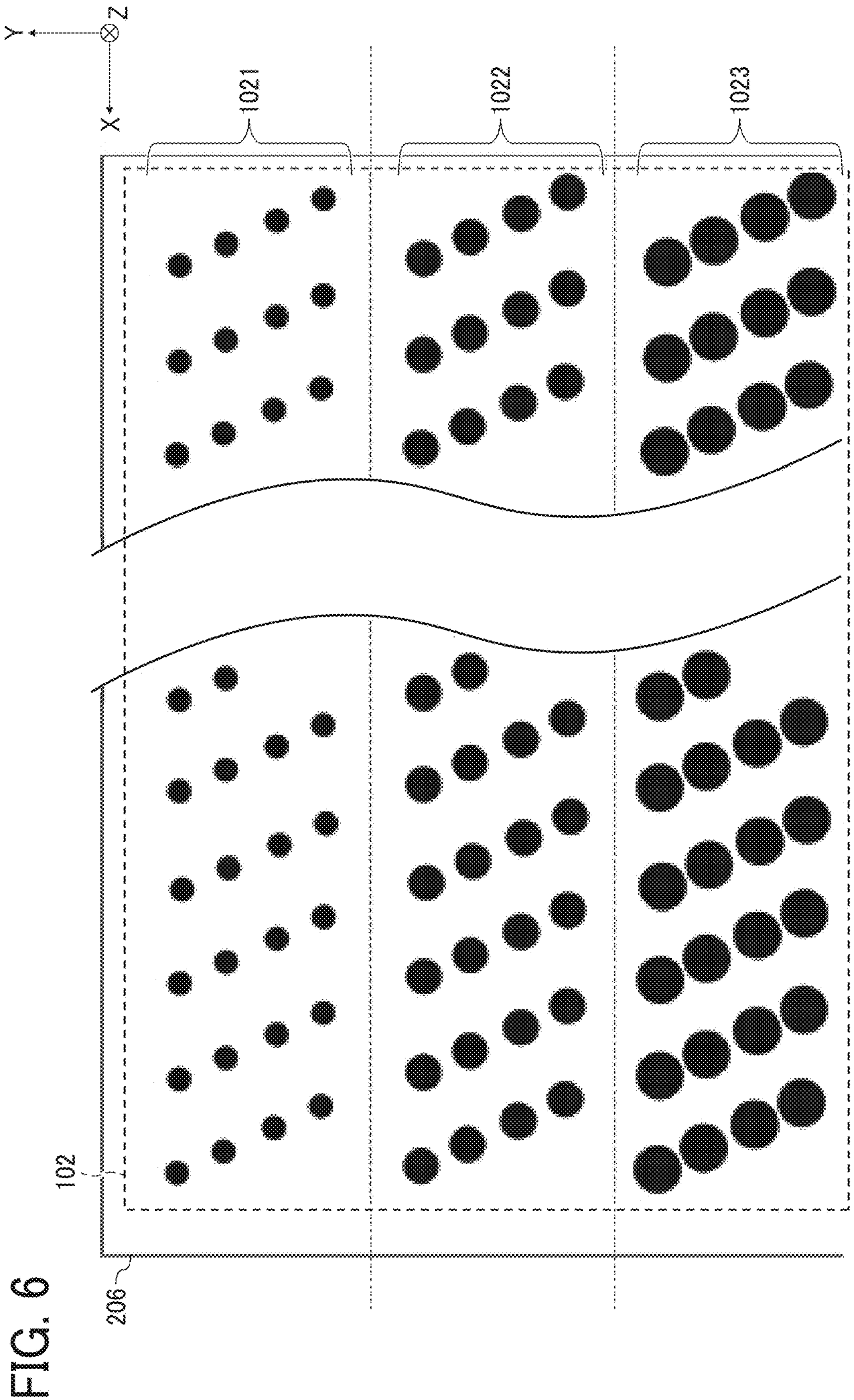
FIG. 6 is a diagram illustrating an example of a test pattern.

FIG. 6 is a diagram illustrating an example of a test pattern 102. For example, the test pattern 102 is formed on the web 206 with a dot group that is a group of second dots of each of the driving waveforms 100. Hereinafter, a case is exemplified in which the test pattern 102 is constituted by a "first dot group 1021", a "second dot group 1022", and a "third dot group 1023".

The first dot group 1021 is a dot group constituted by second dots formed with the first driving waveform.

The second dot group 1022 is a dot group constituted by second dots formed with the second driving waveform.

The third dot group 1023 is a dot group constituted by second dots formed with the third driving waveform.

In this way, the test pattern 102 is formed with the plurality of driving waveforms 100 that is switched. The test pattern 102 may not be formed at once with the plurality of driving waveforms 100 that is switched. That is to say, image formation may be performed a plurality of times to form the test pattern 102.

The test pattern 102 is not limited to the illustrated configuration. For example, the arrangement or the number of second dots may be different from the arrangement or the number of the illustrated second dots. However, second dots may be arranged such that different second dots do not overlie, and the second dots are regularly arranged. The regular arrangement in this way reduces unusable sheets.

The second dots may be formed one dot by one dot with each of the nozzles. When the second dots are formed one dot by one dot in this way, the effect of the variation in the discharge amounts in the head 210 and the nozzles is decreased.

After the test pattern 102 is formed as described above, the reading device 204 reads the test pattern 102 to generate image data. Next, the reading device 204 analyzes the image data to generate second data. The procedure of generation of the second data will be described below.

Figure 7:
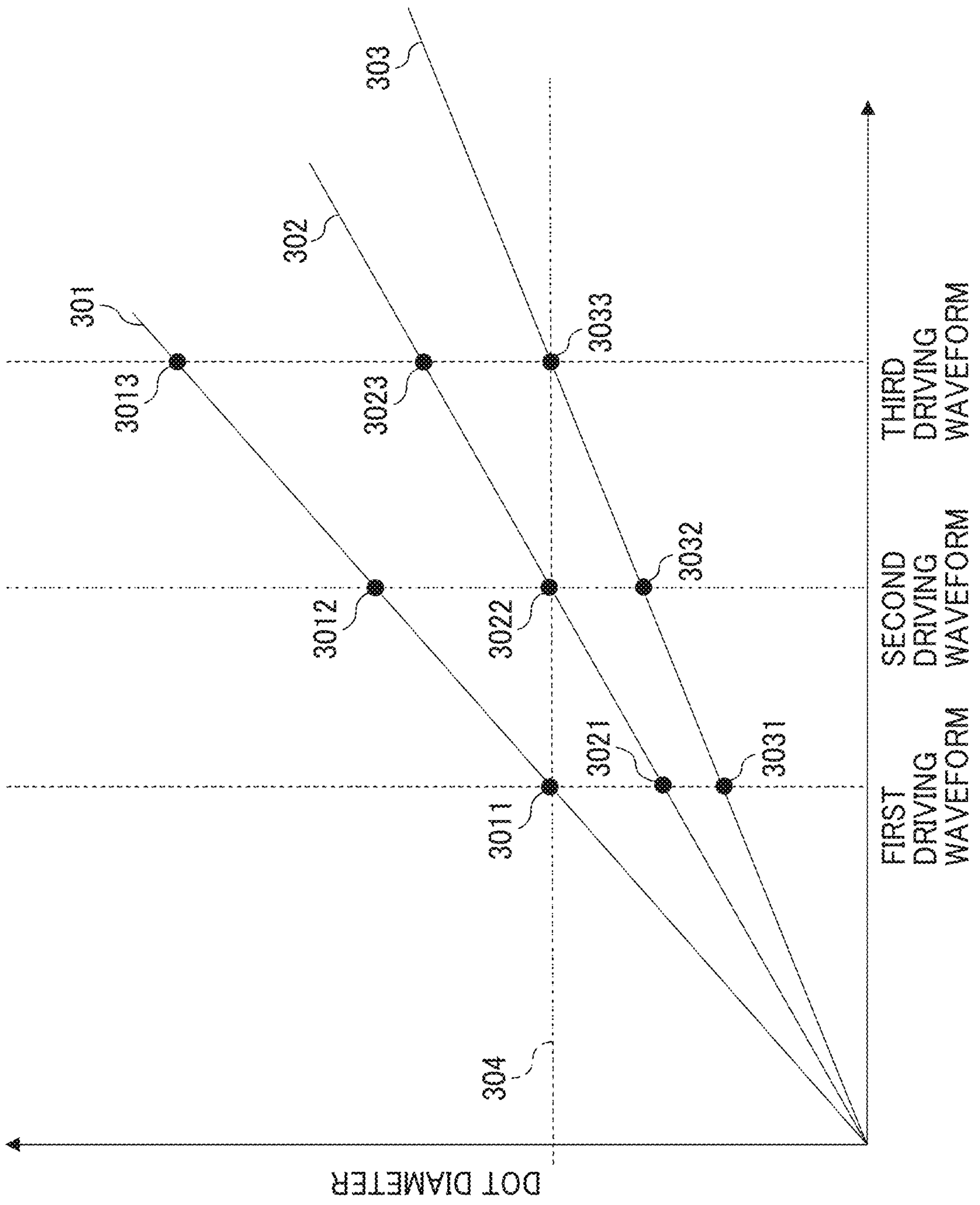
FIG. 7 is a graph illustrating an example of comparison and selection.

FIG. 7 is a graph illustrating an example of comparison and selection. Hereinafter, the second data is dot diameters. For example, the second data is generated for each of the types of recording media. More specifically, the recording media is of three types: a first sheet 301, a second sheet 302, and a third sheet 303.

For example, of the three types, the first sheet 301 is a recording medium on which liquid is the most likely to be sucked and spread. Of the three types, the third sheet 303 is a recording medium on which liquid is the least likely to be sucked and spread. The second sheet 302 is a recording medium that has the medium likeliness, between the first sheet 301 and the third sheet 303, of liquid being sucked and spreading on the second sheet 302.

The test patterns 102 are formed on these recording media to read the test patterns 102 to obtain measurement results, such as an eleventh measurement result 3011, a twelfth measurement result 3012, a thirteenth measurement result 3013, a twenty-first measurement result 3021, a twenty-second measurement result 3022, a twenty-third measurement result 3023, a thirty-first measurement result 3031, a thirty-second measurement result 3032, and a thirty-third measurement result 3033.

The eleventh measurement result 3011 is a result of measurement of the diameter of second dots formed on the first sheet 301 with the first driving waveform.

The twelfth measurement result 3012 is a result of measurement of the diameter of second dots formed on the first sheet 301 with the second driving waveform.

The thirteenth measurement result 3013 is a result of measurement of the diameter of second dots formed on the first sheet 301 with the third driving waveform.

The twenty-first measurement result 3021 is a result of measurement of the diameter of second dots formed on the second sheet 302 with the first driving waveform.

The twenty-second measurement result 3022 is a result of measurement of the diameter of second dots formed on the second sheet 302 with the second driving waveform.

The twenty-third measurement result 3023 is a result of measurement of the diameter of second dots formed on the second sheet 302 with the third driving waveform.

The thirty-first measurement result 3031 is a result of measurement of the diameter of second dots formed on the third sheet 303 with the first driving waveform.

The thirty-second measurement result 3032 is a result of measurement of the diameter of second dots formed on the third sheet 303 with the second driving waveform.

The thirty-third measurement result 3033 is a result of measurement of the diameter of second dots formed on the third sheet 303 with the third driving waveform.

The dot diameter is calculated considering resolution if the resolution is fixed.

In a case of a recording medium on which liquid is likely to be sucked and spread, such as the first sheet 301, liquid is likely to be sucked and spread after the impact. Therefore, the dot diameter is likely to be a large value, as indicated by the eleventh measurement result 3011 to the thirteenth measurement result 3013. In a case of a recording medium on which liquid is not likely to be sucked and spread, such as the third sheet 303, liquid is not likely to be sucked and spread after the impact. Therefore, the dot diameter is likely to be a small value even if a liquid amount is large, as indicated by the thirty-first measurement result 3031 to the thirty-third measurement result 3033.

In this way, results of the dot diameters may differ between the types of recording media, or the like even if the driving waveform is the same. Therefore, the test patterns 102 are read to generate the second data that indicates the dot diameters and the like.

Next, the second data is compared with the first data. In the illustrated example, the first data indicates a threshold 304. For example, the threshold 304 is preliminarily set.

In the illustrated example, if the first sheet 301 is used, the difference between the threshold 304 and the eleventh measurement result 3011 is the smallest. Therefore, if the first sheet 301 is used, using the first driving waveform optimizes the size. Therefore, if the first sheet 301 is used, the first driving waveform is selected.

Similarly, if the second sheet 302 is used, the difference between the threshold 304 and the twenty-second measurement result 3022 is the smallest. Therefore, if the second sheet 302 is used, using the second driving waveform optimizes the size. Therefore, if the second sheet 302 is used, the second driving waveform is selected.

If the third sheet 303 is used, the difference between the threshold 304 and the thirty-third measurement result 3033 is the smallest. Therefore, if the third sheet 303 is used, using the third driving waveform optimizes the size. Therefore, if the third sheet 303 is used, the third driving waveform is selected.

In this way, the optimum size is set by acquiring the first data, such as the threshold 304. On the contrary, the liquid discharge apparatus generates and reads the test patterns 102 to generate the second data. The liquid discharge apparatus compares the first data with the second data to determine a result the closest to the optimum size. In this way, the liquid discharge apparatus can select a driving waveform that discharges the optimum size.

Example of Procedure of Generation of Second Data

For example, the second data is generated as described below.

Figure 8B:
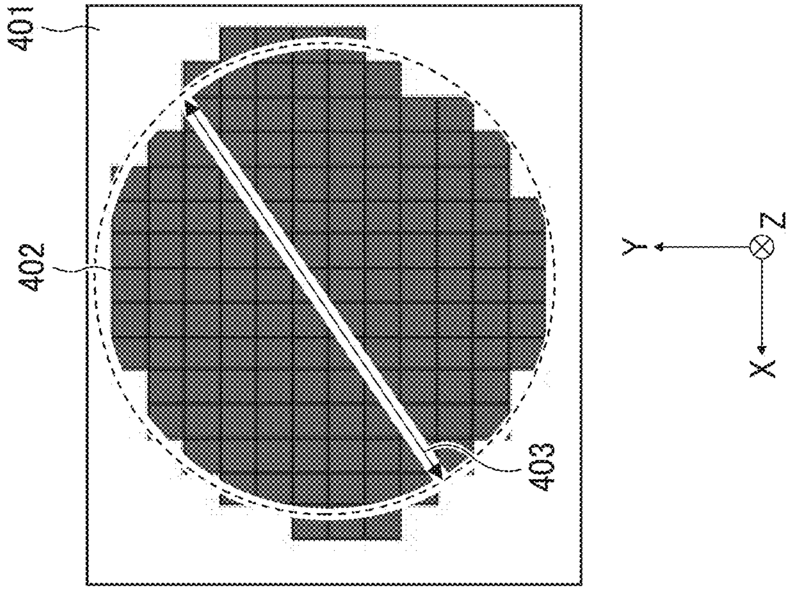
FIG. 8B is a diagram illustrating an example of generation of the second data.
Figure 8A:
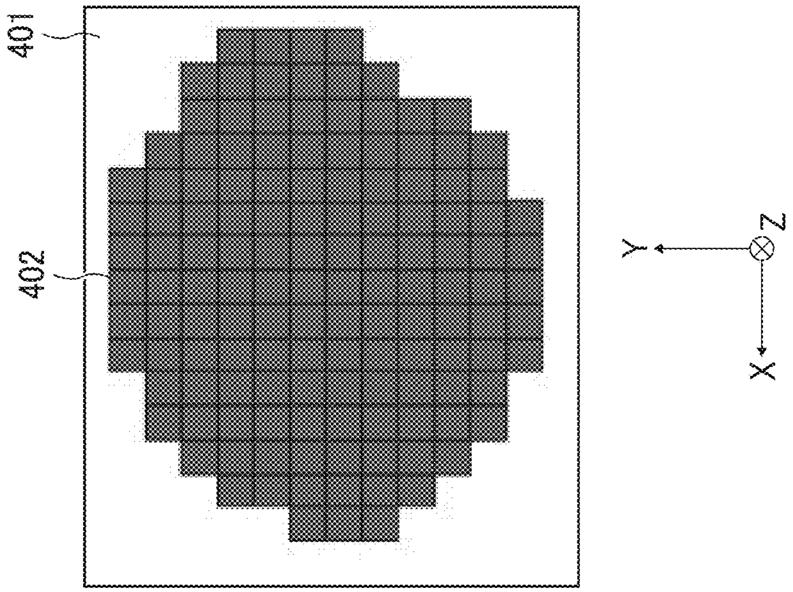
FIG. 8A is a diagram illustrating an example of generation of second data.

FIGS. 8A and 8B are diagrams illustrating an example of generation of the second data. First, the test pattern 102 is read, and image data that indicates a second dot is generated, as illustrated in FIG. 8A, for example. Next, the liquid discharge apparatus performs binarization of the image data.

When as illustrated in FIG. 8A, the liquid discharge apparatus performs the binarization, the liquid discharge apparatus can recognize an area where liquid is applied (hereinafter referred to as the "applied area 402") and an area where liquid is not applied (hereinafter referred to as the "blank area 401"). For the binarization for recognizing the blank area 401 and the applied area 402, a threshold or the like may be set considering the color of the recording medium, the type of the liquid, and the like.

The area of the applied area 402 is determined from, for example, a count value of pixels that constitute the applied area 402 (hereinafter referred to as the "count value"). The area of the one pixel is determined from, for example, resolution. Therefore, the area may be determined by the result of multiplication of the area of a pixel unit determined by resolution, by a count value.

For example, the second data, that is to say a dot diameter, may be generated on the basis of a count value, the area, or the like.

To generate the second data, roundness that makes a second dot a perfect circle, or the like may be used.

FIG. 8B is a diagram illustrating an example in which the second dot illustrated in FIG. 8A is made to be a perfect circle. A second dot may be a shape that is not a perfect circle, such as an ellipse illustrated in FIG. 8A, for example. In such a case, the liquid discharge apparatus may calculate the diameter of the second dot supposed to be a perfect circle (hereinafter referred to as the "third dot diameter 403"). More specifically, the third dot diameter 403 is calculated by the following Expression (1) or the like.

$$\text{third dot diameter}=\sqrt{(4\times\text{area})/\pi} \quad (1)$$

In Expression (1) above, the "area" is the result of multiplication of the area of a pixel unit determined by resolution, by a count value. In this way, the third dot diameter 403 calculated with Expression (1) above may be used for the second data.

The second data may be a Feret diameter (also referred to as a "projection width" or the like) calculated on the basis of the result of binarization.

The second data may be a statistical value or the like determined by statistical processing, such as average. The test pattern 102 is constituted by a plurality of second dots, as illustrated in FIG. 6. In such a case, the plurality of second dots is objects of reading, and a plurality of reading results is acquired.

The statistical value is, for example, the average value, the median, or the maximum value. Using such a statistical value decreases the effect of the bias of second dots, and the like.

If such statistical processing as described above is performed, second dots as objects of the statistical processing may be selected. For example, it may be determined that a second dot a portion of which is lost is an exclusion object. The second dot that receives the determination that the second dot is an exclusion object may be excluded from calculation of a statistical value.

More specifically, first, the roundness of each of second dots is calculated. Exclusion objects are determined by comparing the roundness of each of the second dots with a set value preliminarily set. For example, the roundness is a value that is closer to "1" as the shape is closer to a perfect circle. The set value is, for example, a value from 0.5 to 0.6 preliminarily set. In such a case, a second dot that has roundness smaller than the set value is an exclusion object.

The roundness may be calculated by a calculation method defined in Japanese Industrial Standard (JIS) B 0621-1984 or the like.

Alternatively, an exclusion object may be a second dot that receives a determination that the second dot is abnormal, with an average value$\pm 3\sigma$ ("$\sigma$" is the standard deviation) as the standard.

As described above, even if abnormal dots are included, excluding the abnormal dots allows the liquid discharge apparatus to accurately select a driving waveform that provides the optimum size.

Example of Liquid Discharge System

A liquid discharge system 20 that includes the liquid discharge apparatus may have the following configuration.

Figure 9:
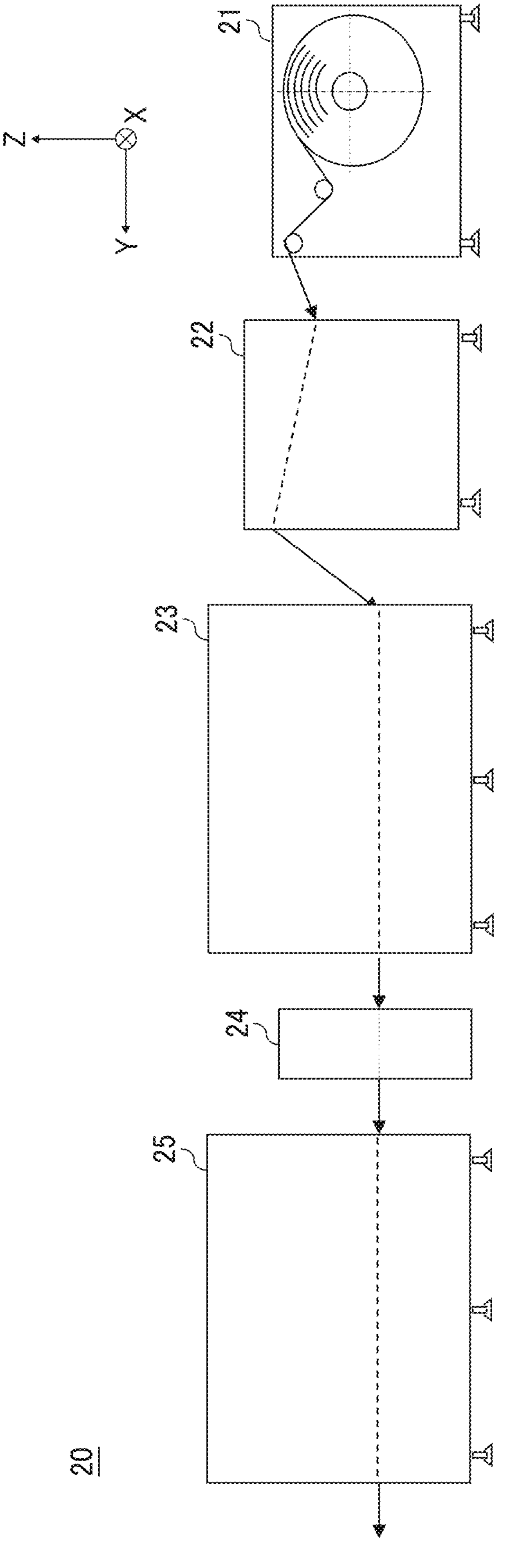
FIG. 9 is a diagram illustrating a general configuration of a modification.

FIG. 9 is a diagram illustrating a general configuration of a modification. The liquid discharge system 20 includes, for example, a sheet feeder 21, a treatment agent liquid application apparatus 22, a first inkjet apparatus 23 as an example of the liquid discharge apparatus, a reversing apparatus 24, and a second inkjet apparatus 25.

A recording medium is, for example, a rolled sheet that is continuous stationery.

The sheet feeder 21 conveys the recording medium to the treatment agent liquid application apparatus 22.

The treatment agent liquid application apparatus 22 performs pretreatment to the recording medium. For example, the treatment agent liquid application apparatus 22 applies treatment agent liquid to the front and back of the recording medium.

The first inkjet apparatus 23 discharges liquid to the recording medium to perform image formation and the like. For example, the first inkjet apparatus 23 forms an image indicated by image data, on the front of the recording medium.

The reversing apparatus 24 turns over the recording medium.

The second inkjet apparatus 25 discharges liquid to the recording medium to perform image formation and the like. For example, the second inkjet apparatus 25 forms an image indicated by image data, on the back of the recording medium.

The liquid discharge system 20 may not have the illustrated configuration. For example, the liquid discharge system 20 may additionally include an apparatus that performs pretreatment or aftertreatment except the illustrated types of pretreatment and aftertreatment. The number of the liquid discharge apparatus may be one or three or more.

Example of Configuration that Detects Position of Recording Medium

Figure 10:
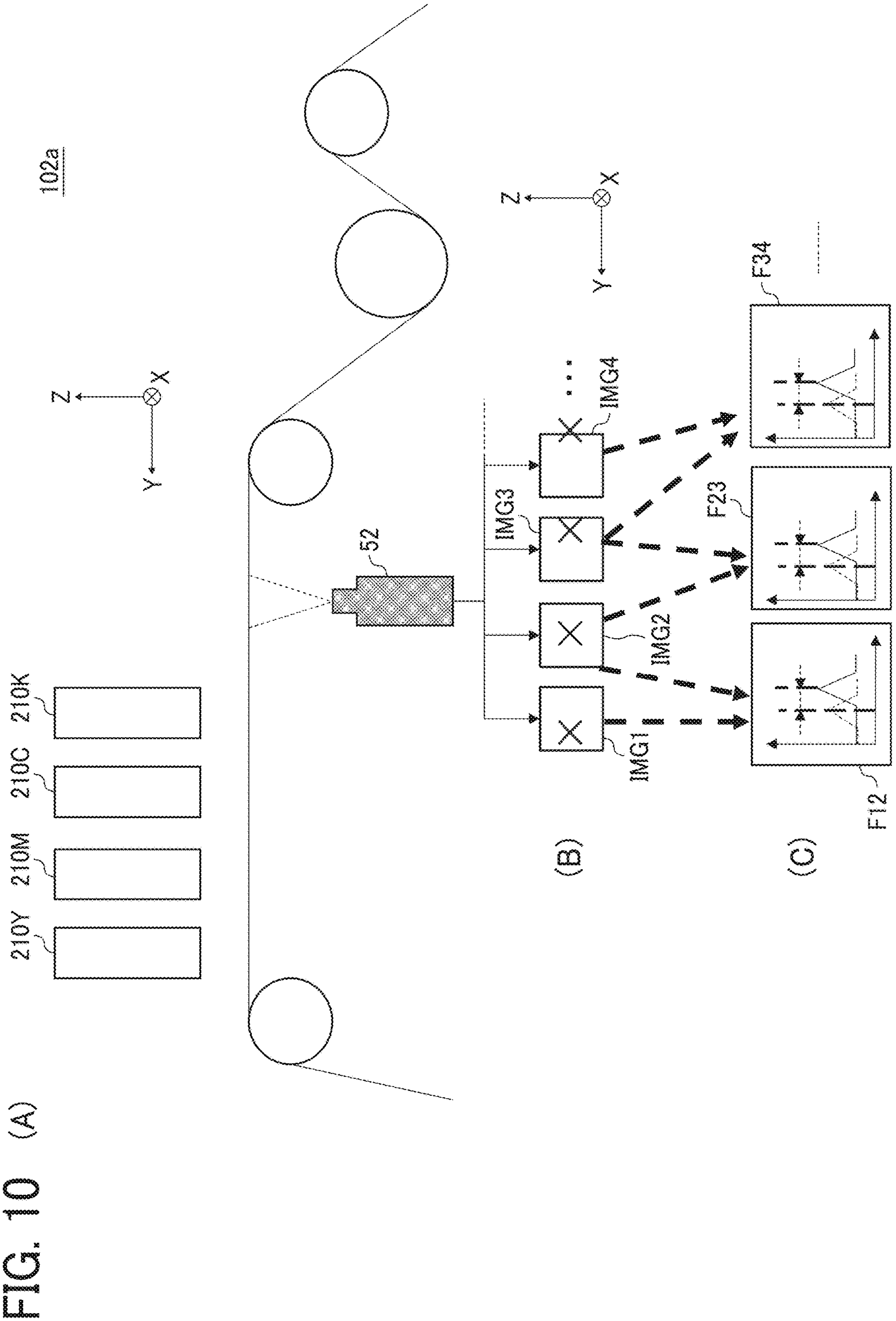
FIG. 10 is a diagram illustrating an example of configuration that detects the position of the recording medium with the image sensor.

FIG. 10 is a diagram illustrating an example of configuration that detects the position of a recording medium with an image sensor 52. The liquid discharge apparatus may have, for example, the following configuration.

As illustrated in part (A) of FIG. 10, the first inkjet apparatus 23 has a hardware configuration that includes the image sensor 52.

The image sensor 52 captures a conveyed recording medium to generate image data. More specifically, the image sensor 52 captures the front of the recording medium at preset intervals.

Part (B) of FIG. 10 is a diagram schematically illustrating intervals at which the image sensor 52 performs the capture. Hereinafter, image data in the order of the capture is referred to as "first image data IMG1", "second image data IMG2", "third image data IMG3", "fourth image data IMG4", and . . . .

Then the first inkjet apparatus 23 performs frequency analysis processing, such as fast Fourier transform (FFT), to the image data. The first inkjet apparatus 23 uses the results of the frequency analysis processing to calculate a peak of image correlation between two pieces of image data.

Part (C) of FIG. 10 is a diagram illustrating an example of the frequency analysis result. More specifically, the first inkjet apparatus 23 generates a "first analysis result F12", on the basis of the first image data IMG1 and the second image data IMG2. Similarly, the first inkjet apparatus 23 generates a "second analysis result F23", on the basis of the second image data IMG2 and the third image data IMG3. Next, the first inkjet apparatus 23 generates a "third analysis result F34", on the basis of the third image data IMG3 and the fourth image data IMG4. A peak is calculated in each of the analysis results.

On the basis of the peaks calculated in this way, the first inkjet apparatus 23 calculates a conveyance amount. More specifically, the first inkjet apparatus 23 compares the positions of the peaks with each other to calculate a change in the position of the pattern on the surface of a recording medium. On the basis of such results, the first inkjet apparatus 23 generates a pulse at, for example, each time when the conveyance amount reaches a fixed value.

Similarly as an encoder roller or the like, such a configuration allows the first inkjet apparatus 23 to generate a signal that indicates the position change, the conveyance speed, the combination of the position change and the conveyance speed, or the like. The configuration that detects the position of a recording medium with the image sensor 52 decreases work for preliminarily preparing a slit or the like in a recording medium.

The comparison may be performed by processing except the processing described above. For example, the determination of similarity with artificial intelligence (AI) or the like may be performed for the comparison. More specifically, first data is image data or the like that indicates a standard pattern. Second data is image data or the like read from second dots. The AI is preliminarily trained with the first data as training data. Such a configuration allows the AI to compare the first data with the second data. That is to say, the AI allows the liquid discharge apparatus to select a driving waveform that forms dots the closest to a dot indicated by the first data.

Functional-Configuration Example

Figure 11:
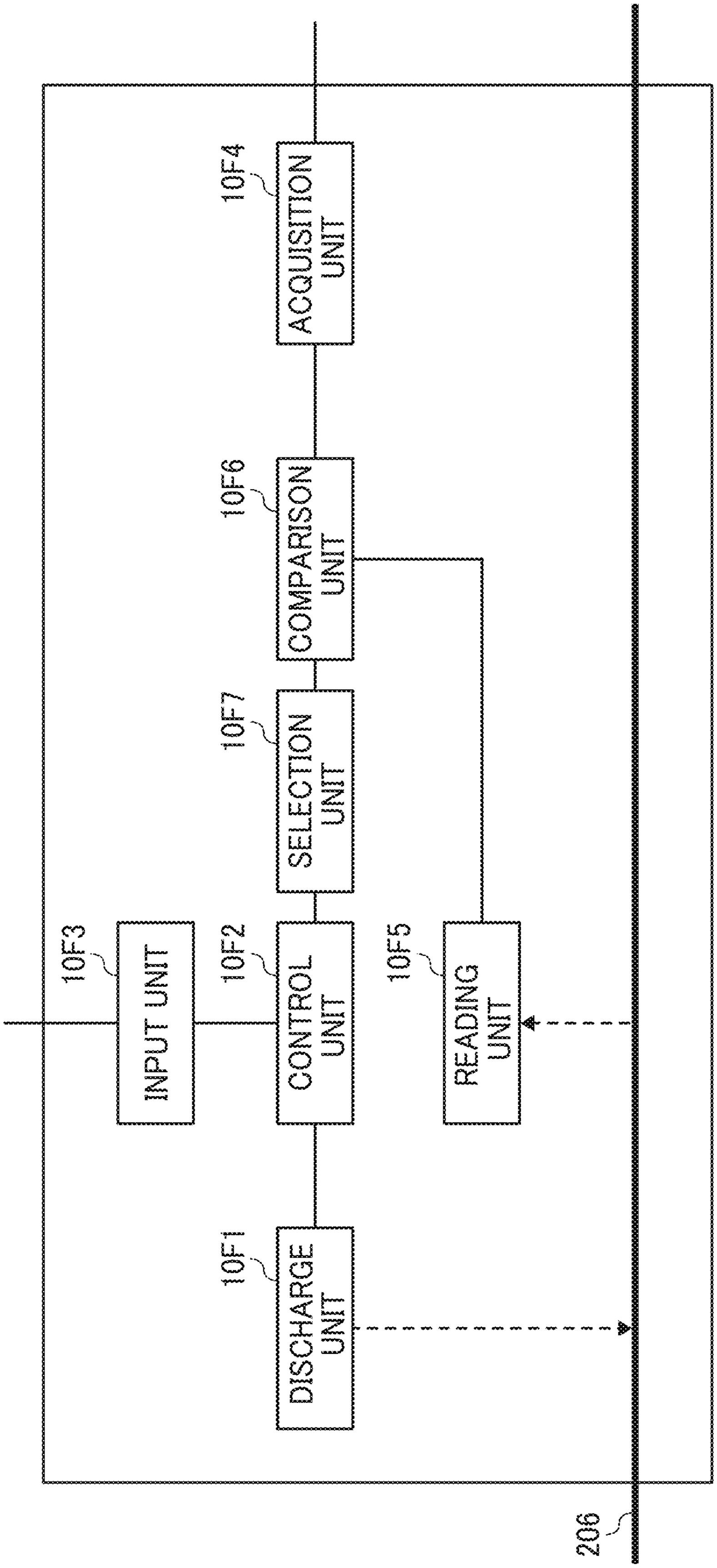
FIG. 11 is a diagram illustrating a functional-configuration example.

FIG. 11 is a diagram illustrating a functional-configuration example. The liquid discharge apparatus includes, for example, a discharge unit 10F1, a control unit 10F2, an input unit 10F3, an acquisition unit 10F4, a reading unit 10F5, a comparison unit 10F6, and a selection unit 10F7.

The discharge unit 10F1 discharges liquid to a recording medium to perform a discharge procedure that forms a test pattern. The discharge unit 10F1 is implemented by, for example, the head 210 and the like.

The control unit 10F2 performs a control procedure that makes the discharge unit 10F1 discharge liquid according to a driving waveform. The control unit 10F2 is implemented by, for example, the engine 208 and the like.

The input unit 10F3 performs an input procedure that inputs a plurality of driving waveforms. The input unit 10F3 is implemented by, for example, the superior device 207 and the like.

The acquisition unit 10F4 performs an acquisition procedure that acquires first data. The acquisition unit 10F4 is implemented by, for example, the superior device 207 and the like.

The reading unit 10F5 reads a test pattern to perform a reading procedure that generates second data. The reading unit 10F5 is implemented by, for example, the reading device 204 and the like.

The comparison unit 10F6 performs a comparison procedure that compares the second data with the first data. The comparison unit 10F6 is implemented by, for example, the superior device 207 and the like.

On the basis of the result of the comparison by the comparison unit 10F6, the selection unit 10F7 performs a selection procedure that selects a driving waveform that makes the smallest difference between the second data and the first data. The selection unit 10F7 is implemented by, for example, the superior device 207 and the like.

In a commercial field, for example, a liquid discharge apparatus that has a combination of resolution and a conveyance speed (that may be referred to as a "line speed") according to a printing application. For such a liquid discharge apparatus, the conveyance speed is set high, and the resolution is set low to increase the productivity, for example. To give a priority to the quality, the conveyance speed is set low, and the resolution is set high.

In this way, if there is a plurality of types of resolution, as the resolution becomes lower, the liquid discharge apparatus makes liquid that has a larger size impact on a recording medium to deal with filling the image. Therefore, the optimum size exists for each of the conditions, such as the resolution.

When the size is smaller than the optimum size, the image is insufficiently filled. Thus, insufficient density, such as insufficient solid printing, and the like occur. On the other hand, when the size is larger than the optimum size, the granularity becomes poor.

Further, the characteristics of recording media differ between the types of the recording media, and the like. The size is affected by, for example, the characteristics, such as easiness of liquid being sucked and spreading, an outer air, humidity, or the like. The size is particularly often much affected by the characteristics of a recording medium. Therefore, to optimize the size, the liquid discharge apparatus forms a test pattern. When the test pattern is formed in this way, the size of discharged liquid is optimized.

If an image is formed by discharging liquid, the liquid discharge apparatus optimizes the size to improve the density characteristic, the granularity, or the like to improve the image quality.

Other Embodiments

The liquid discharge method described above may be implemented by, for example, a program. That is to say, the liquid discharge method is a method executed by a computer that allows the computing device, the storage device, the input device, the output device, and the control device to cooperate on the basis of the program. The program may be written into the storage device, a storage medium, or the like and distributed, or may be distributed via an electrical communication line or the like.

Each of the devices described above may not be one device. That is to say, each of the devices may be a system or the like that includes a plurality of devices.

The image forming apparatus may be, for example, a commercial printing machine (for example, a large-scale electrophotographic printer or an inkjet printer).

The recording medium is, for example, a sheet (that may be referred to as a "plain sheet of paper" or the like). However, the recording medium may be a coated sheet, a label sheet, or the like except the sheet, or an overhead projector sheet, a film, a flexible thin plate, or the like. The recording medium may be a rolled sheet or the like.

That is to say, the material of the recording medium only needs to have a material property such as ink or paint, such as toner, being capable of sticking to the material, being capable of temporarily sticking to the material, being capable of sticking and adhering to the material, or being capable of sticking to and permeating the material.

More specifically, the recording medium is a sheet, a film, a medium to be recorded, such as cloth, an electronic board, an electronic component, such as a piezoelectric element (that may be referred to as a "piezoelectric component" or the like), a powder material layer (that may be referred to as a "powder layer" or the like), an organ model, a cell for inspection, or the like.

In this way, the material property of the recording medium may be paper, thread, fiber, fabric, leather, metal, plastic, glass, wood, or ceramics to which paint can stick, or the combination of paper, thread, fiber, fabric, leather, metal, plastic, glass, wood, and ceramics to which paint can stick.

The liquid is not limited to ink but may not be ink if the liquid has a material property of sticking to the recording medium.

The present disclosure is not limited to the above-described and exemplified embodiments, and various modifications can be made without departing from the technical spirit of the present disclosure. Objects of the present disclosure include all technical matters included in a technical idea described in the claims. It is therefore to be understood that, the disclosure of this patent specification may be practiced otherwise by those skilled in the art than as specifically described herein, and such modifications and alternatives are within the technical scope of the appended claims. Such embodiments and variations thereof are included in the scope and gist of the embodiments of the present disclosure and are included in the embodiments described in the claims and the equivalent scope thereof.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge apparatus comprising:

a discharge device configured to discharge liquid to a recording medium to form a test pattern;

a driving device configured to cause the discharge device to discharge the liquid according to a driving waveform;

processing circuitry configured to:

input a plurality of driving waveforms; and acquire first data indicating a standard pattern that corresponds to the driving waveform and is formed with the driving waveform or indicating a parameter of the standard pattern; and a reading device configured to read the test pattern to generate second data, the processing circuitry configured to:

compare the second data with the first data; and select a driving waveform generating a smallest difference between the second data and the first data, based on a result of comparison of the second data with the first data, wherein the processing circuitry is further configured to compare the first data into which a first dot diameter is input that is a diameter of a first dot constituting the standard pattern, with the second data indicating a result of measurement of a second dot diameter that is a diameter of a second dot constituting the test pattern.

2. The liquid discharge apparatus according to claim 1, wherein the reading device is configured to generate image data that indicates the second dot, perform binarization of the image data to recognize an area where the liquid is applied, and generate the second data based on a count value of pixels constituting the area, the result of measurement of the second dot diameter, and a resolution of the image data.

3. The liquid discharge apparatus according to claim 2, wherein the reading device is configured to calculate, based on the count value, a third dot diameter that is a diameter of the second dot to be formed as a perfect circle, to generate the second data.

4. The liquid discharge apparatus according to claim 1, wherein the second data indicates a statistical value that includes an average value, a median, or a maximum value obtained from statistical processing of a plurality of second dot diameters that are diameters of second dots constituting the test pattern.

5. The liquid discharge apparatus according to claim 4, wherein a roundness of each of the second dots is calculated, and the second data indicates the statistical value calculated from second dot diameters other than a diameter of a second dot determined to be excluded based on the roundness.

6. A liquid discharge method to be performed by a liquid discharge apparatus, the liquid discharge method comprising:

discharging liquid by a liquid discharge apparatus to a recording medium to form a test pattern;

controlling the liquid discharge apparatus to discharge the liquid according to a driving waveform;

inputting a plurality of driving waveforms;

acquiring first data that indicates a standard pattern that corresponds to the driving waveform and is formed with the driving waveform, or indicates a parameter of the standard pattern;

reading the test pattern to generate second data;

comparing the second data with the first data, including comparing the first data into which a first dot diameter is input that is a diameter of a first dot constituting the standard pattern, with the second data indicating a result of measurement of a second dot diameter that is a diameter of a second dot constituting the test pattern; and selecting a driving waveform generating a smallest difference between the second data and the first data, based on a result of comparison of the second data with the first data by the comparing.

7. A non-transitory recording medium storing a plurality of instructions which, when executed by one or more processors, cause the processors to perform:

discharging liquid by a liquid discharge apparatus to a recording medium to form a test pattern;

controlling the liquid discharge apparatus to discharge the liquid according to a driving waveform;

inputting a plurality of driving waveforms;

acquiring first data that indicates a standard pattern that corresponds to the driving waveform and is formed with the driving waveform, or indicates a parameter of the standard pattern;

reading the test pattern to generate second data;

comparing the second data with the first data, including comparing the first data into which a first dot diameter is input that is a diameter of a first dot constituting the standard pattern, with the second data indicating a result of measurement of a second dot diameter that is a diameter of a second dot constituting the test pattern; and selecting a driving waveform generating a smallest difference between the second data and the first data, based on a result of comparison of the second data with the first data by the comparing.

* * * * *